United States Patent [19]

Scholin et al.

[11] 4,004,497
[45] Jan. 25, 1977

[54] AUTOMATIC SYSTEMS PROGRAMMER

[75] Inventors: Harold W. Scholin, Park Ridge; Hieronim L. Lisiecki, Chicago, both of Ill.

[73] Assignee: Scholin Industries, Inc., Chicago, Ill.

[22] Filed: May 22, 1974

[21] Appl. No.: 472,489

[52] U.S. Cl. .................. 91/36; 74/568 M; 74/568 T; 91/37; 137/624.12; 137/624.18; 200/38 BA; 200/38 CA; 251/130

[51] Int. Cl.$^2$ ..................... F15B 21/02

[58] Field of Search ............ 91/35, 36, 37, 39; 137/624.18, 624.2, 624.12; 74/568 R, 568 M, 568 T, 568 F; 200/38 B, 38 BA, 38 CA; 251/130

[56] References Cited

UNITED STATES PATENTS

| | | | |
|---|---|---|---|
| 1,543,840 | 6/1925 | Grigoleit | 251/130 X |
| 1,771,905 | 7/1930 | Uher, Jr. | 200/38 CA |
| 2,228,700 | 1/1941 | Hamner | 91/39 X |
| 2,920,152 | 1/1960 | Werner | 200/38 CA X |
| 2,924,103 | 2/1960 | Hamilton | 137/624.12 |
| 3,035,774 | 5/1962 | Ray | 251/130 X |
| 3,051,197 | 8/1962 | Zomer | 137/624.12 |
| 3,069,156 | 12/1962 | Azari | 251/130 X |
| 3,104,298 | 9/1963 | Aldous | 74/568 X |
| 3,177,310 | 4/1965 | Deeken | 74/568 X |
| 3,238,622 | 3/1966 | Bullard | 91/37 X |
| 3,325,609 | 6/1967 | Otterlei | 74/568 X |
| 3,331,254 | 7/1967 | Stoll | 74/568 X |
| 3,372,708 | 3/1968 | Hotchkin | 74/568 X |
| 3,428,085 | 2/1969 | Haberstump | 137/624.2 |
| 3,470,335 | 9/1969 | Roberts | 200/38 CA |
| 3,539,878 | 11/1970 | Bell | 137/624.18 X |
| 3,566,051 | 2/1971 | Hulterstrum | 74/568 T X |
| 3,580,105 | 5/1971 | Gilson | 74/568 M |
| 3,678,225 | 7/1972 | Hulterstrum | 200/38 CA X |
| 3,747,432 | 7/1973 | Cole | 200/38 CA X |
| R28,249 | 11/1974 | Estrem | 200/38 BA X |

FOREIGN PATENTS OR APPLICATIONS 894,631  3/1944  France .................. 251/130

Primary Examiner—Martin P. Schwadron
Assistant Examiner—Abraham Hershkovitz
Attorney, Agent, or Firm—Johnson Dienner Emrich & Wagner

[57] ABSTRACT

A programmer includes an intermittently rotating drum, having thereon a series of actuators arranged in a pre-selected manner, for actuating in a predetermined order, a plurality of devices, such as fluid valves, each of which, when actuated, causes an operation to be performed. The drum is indexed by a stepping motor controlled by impulses of energy to a pilot valve in response to rotation of the drum. The actuators are removably mounted on the drum, so that the programming of the series of operations as to the order thereof, and duration of each, can be done quickly and easily, in advance. Individual valves can also be shut off when not needed.

14 Claims, 19 Drawing Figures

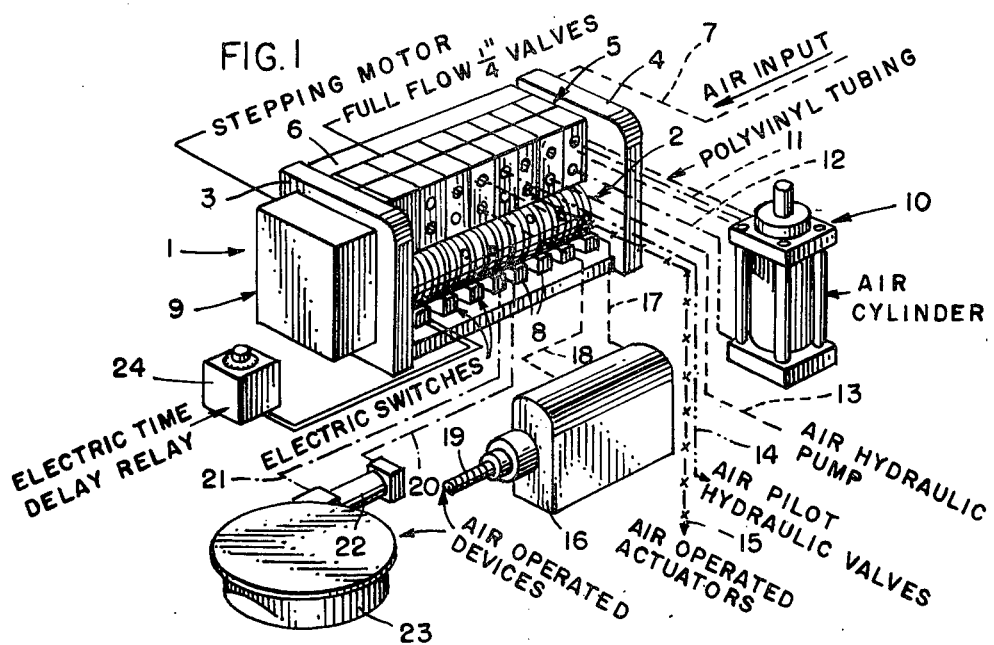
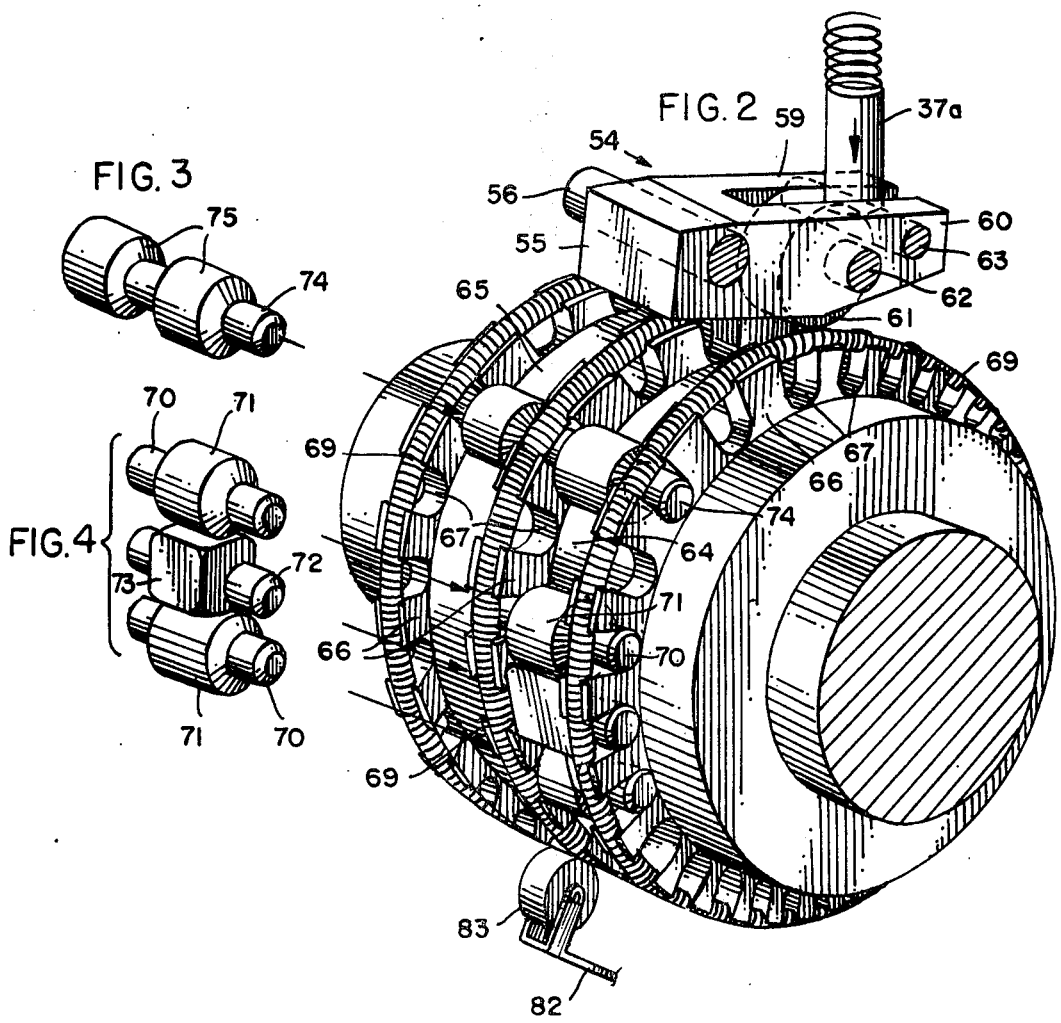

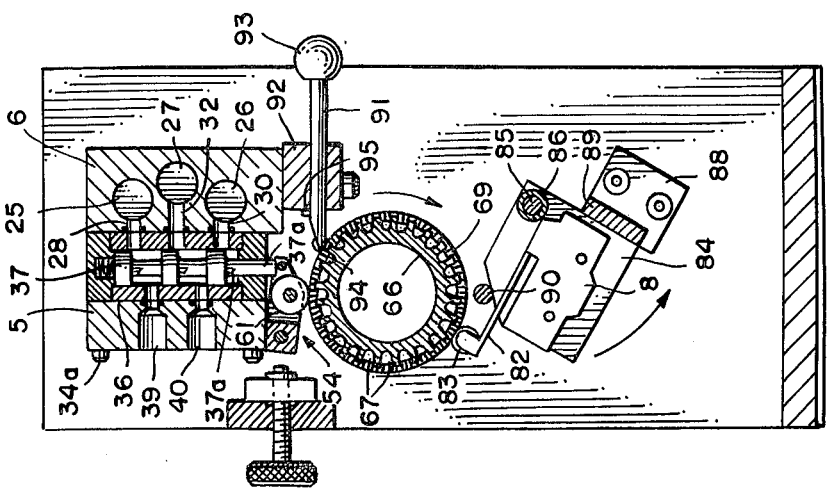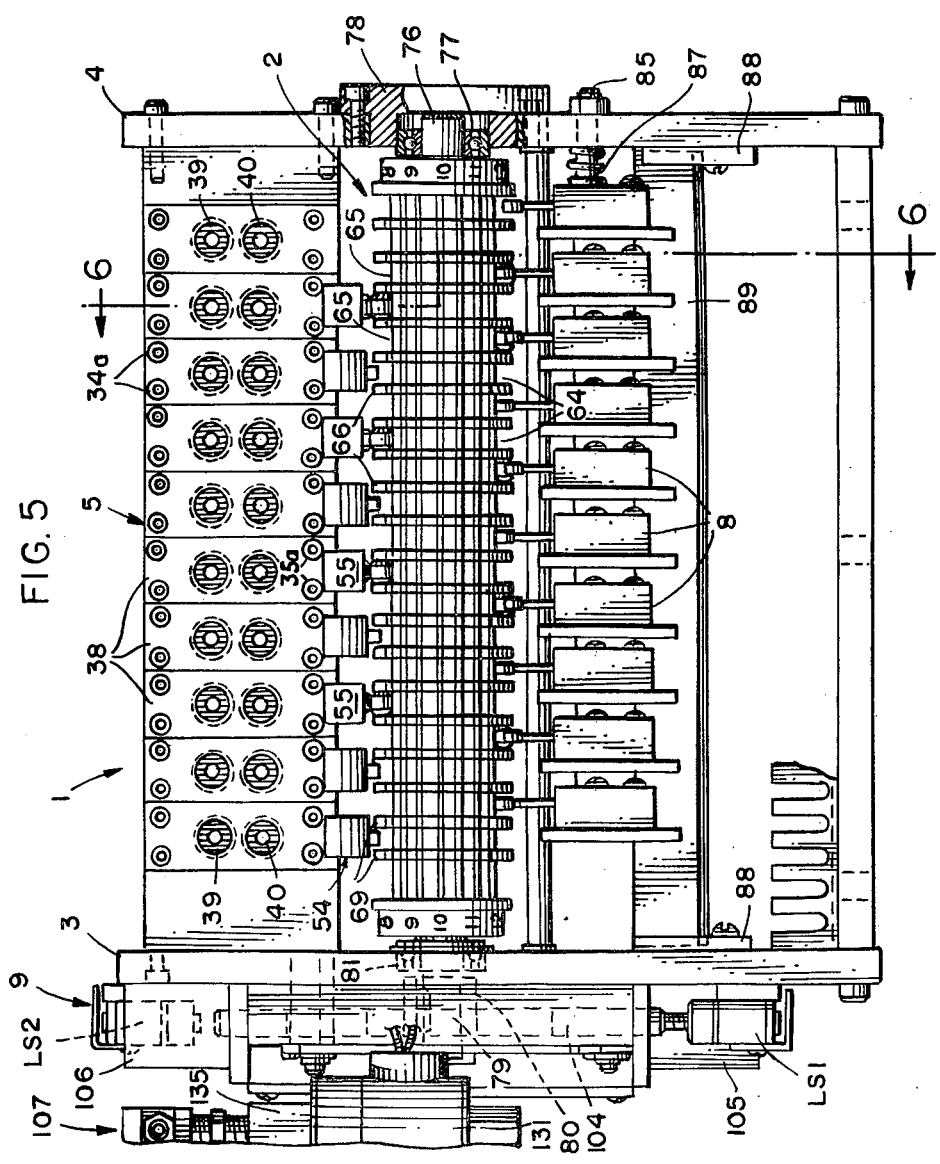

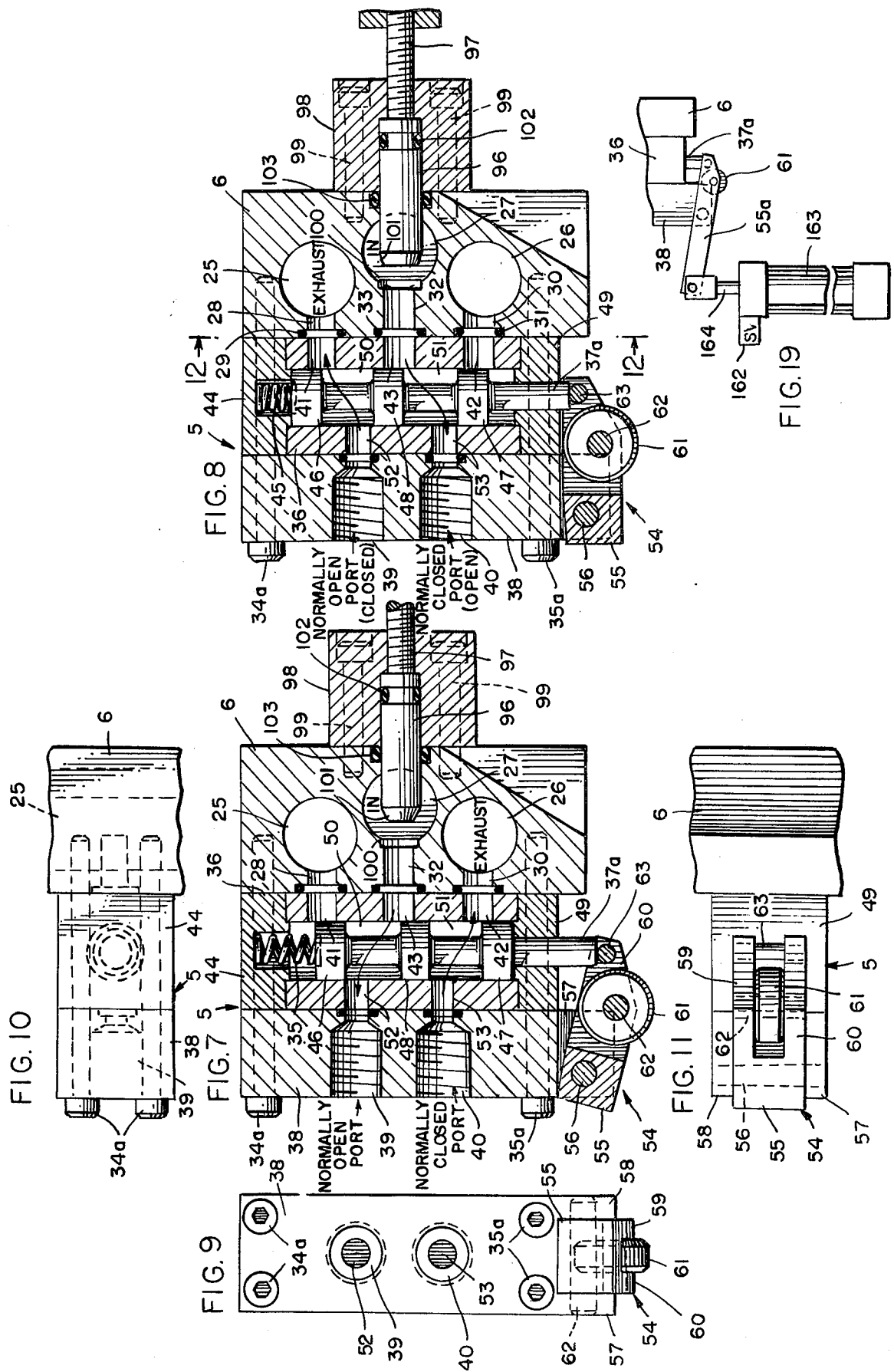

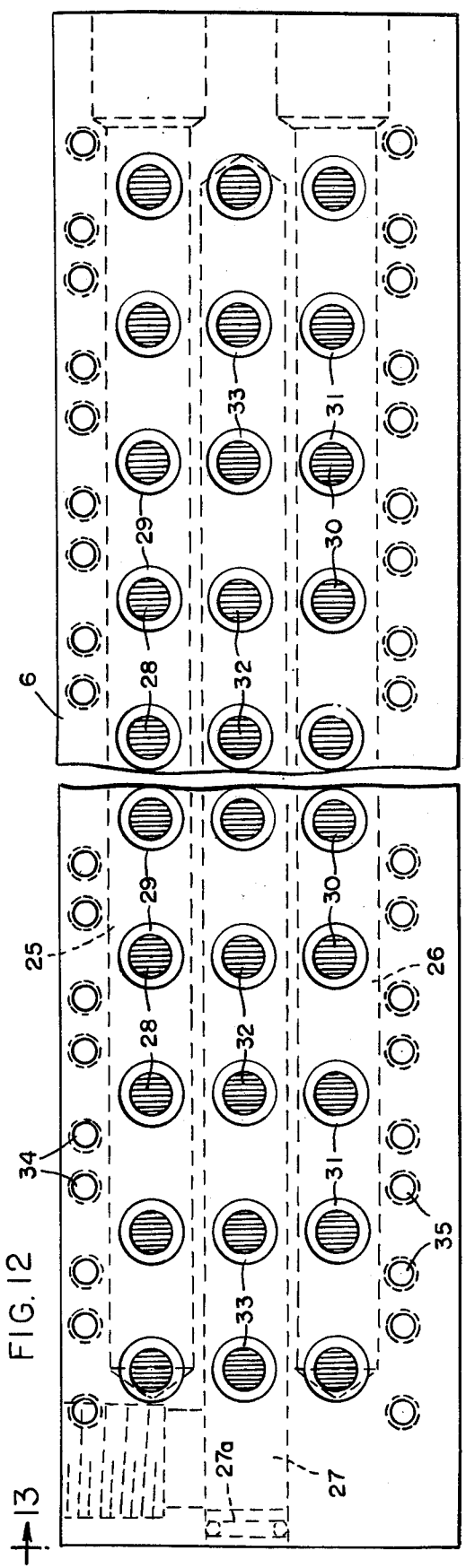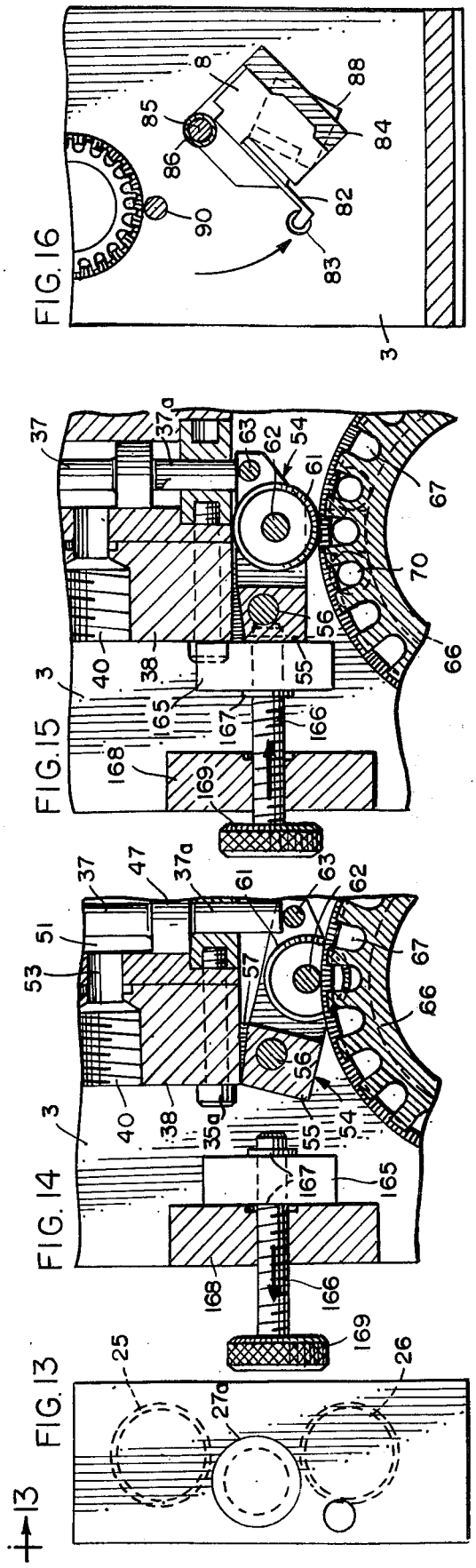

AUTOMATIC SYSTEMS PROGRAMMER

BACKGROUND OF THE INVENTION

In machines where a series or sequence of operations is to be performed, such as, for example, the movement of a spindle, the opening and closing of a fixture, the starting and stopping of a clutch and brake system, etc., it has been necessary heretofore, to provide a multiplicity of electrical circuits for each operation, plus interlocking circuitry, limit switches, etc. Each circuit was to actuate a solenoid for operating a valve to provide fluid pressure to perform a function. Not only did this require an excessive amount of wiring, but also, when a malfunction occurred in the machine, it was difficult and time-consuming to trace the circuitry, and eventually determine the cause, and to remedy it.

The present invention overcomes all of these problems by eliminating most of the electrical circuitry, and wiring, and by providing a positve mechanical lock-in for each operation for safety, rather than interlocking electrical circuitry, and a simple and quick method of programming a sequence of operations.

BRIEF SUMMARY OF THE INVENTION

This invention relates, generally, to a device for programming a series or sequence of operations in a machine, and is particularly directed to the control and operation of a series of valves to provide fluid pressure to perform an operation. Each valve, when actuated, will supply fluid under pressure to operate a device, such as, for example, air cylinders, hydraulic pumps, hydraulic valves, air operated actuators, and devices such as indexing tables.

A feature of the invention is the provision of a plurality of annular grooves on the drum, along the length thereof, and novel means to removably mount valve and switch actuators in these grooves in positions for actuating such valves and switches in a predetermined sequence.

The valves are positioned along the length of the drum, and each valve stem is reciprocated by an actuator on the drum, which is brought into contact with a roller in the path thereof, thereby moving the roller, and its mounting bracket, upwardly against the valve stem to shift the valve spool. Each time this occurs, air or other fluid under pressure causes an operation to be performed.

The drum is indexed, preferably, by a stepping motor, which is associated with a pilot valve, to which an impulse of energy is sent. The impulse, preferably, is electrical, but may be air, if desired, and the pilot valve thereupon actuates the stepping motor to shift the slide, and index the drum to its next position.

In the present disclosure, a series of switches is provided in association with the drum, and each switch is operated by an actuator, also mounted on the drum. In actual practice, if the time it takes for a given operation to be performed is very short, such as applying a brake or engaging a clutch, the closing of a switch by an actuator on the drum may send an electric impulse directly to the pilot valve which, thereupon, causes the stepping motor to index the drum for the next operation to be performed. Aternatively, when the operation being performed takes more time, the electric impulse may be sent to a time delay relay, which will delay indexing of the drum until the operation then being performed is completed or a limit switch may be closed at the end of the stroke of a slide or the like, indicating the operation has been performed, and this will send an impulse to the pilot valve for indexing the drum.

In locations where dangerous atmospheres are present, pneumatic valves could take the place of the electric switches to index the drum, but this arrangement is slow because it is limited to simple pneumatic circuits, in which timers do not work well. For example, in the use of electric switches, the stepping motor can index the drum, approximately 720–750 times per minute, whereas, in pneumatic circuitry, the stepping motor would be limited in its operation to indexing the drum, approximately 500 times per minute.

In view of the foregoing, it is therefore a principal object of the present invention to provide a novel programmer for quickly and easily setting up for, and causing the performance of, a series of operations in a predetermined sequence.

A further object of the invention is to provide a novel programmer for causing a series of operations to be performed by fluid pressure, wherein the order and duration of each operation may be determined in advance, and quickly and easily operation may be determined in advance, and quickly and easily programmed.

Another object of the invention is to provide an automatic systems programmer, wherein the indexing of a drum will operate a series of valves in a predetermined order, and for a predetermined time period for causing a sequence of operations to be performed by the use of fluid pressure.

A further, and more specific, object of the invention is to provide a novel programmer for use in a machine in which a sequence of operations is to be performed by the use of fluid pressure, such as air pressure, and wherein the programmer comprises a rotating drum, on which has been placed a plurality of actuators in a predetermined arrangement, each of which opens an air valve, which causes one of the operations in the machine to be performed.

Other objects of the invention will appear more fully hereinafter, as the description proceeds.

DESCRIPTION OF THE DRAWINGS

FIG. 1 is a diagrammatic illustration, in perspective, of the programmer of the present invention, indicating the manner in which the various types of operations can be performed thereby;

FIG. 2 is a fragmentary perspective view of the programmer drum, showing one of the cam brackets and roller assemblies associated therewith, which controls the operation of the fluid valves;

FIG. 3 is a perspective view of the dual actuator or pin, which may be mounted on the programmer drum for actuating a valve or switch;

FIG. 4 is a perspective view of two single actuators or pins with a filler pin therebetween for actuating a valve or switch, and holding it in actuated position for a longer time period than would a single pin;

FIG. 5 is a side elevational view of the programmer drum, assembled with the valve blocks and switches to be actuated thereby;

FIG. 6 is a vertical, transverse sectional view of the programmer assembly, taken substantially along the plane of line 6—6 of FIG. 5;

FIG. 7 is an enlarged, vertical, transverse sectional view through the air manifold and valve assembly, showing a valve spool in its lower position;

FIG. 8 is a view similar to FIG. 7, but showing the spool shifted to its upper, actuated position;

FIG. 9 is an end elevational view of one of the air blocks with its associated cam bracket and roller assembly;

FIG. 10 is a fragmentary view of the air manifold, with the single air block of FIG. 9 mounted thereon, and shown in top plan;

FIG. 11 is a fragmentary view of the air manifold, showing a bottom view of one of the air blocks mounted thereon;

FIG. 12 is a front, elevational view of the air manifold, taken along the plane of line 12—12 of FIG. 8, and showing the arrangement of inlet and outlet ports for the passage of air;

FIG. 13 is an end, elevational view of the air manifold, taken along the plane of line 13—13 of FIG. 12;

FIG. 14 is a fragmentary, vertical tranverse sectional view through the programmer assembly, illustrating a release device for manually elevating all of the cam bracket and roller assemblies, simultaneously, to release the drum for removal, such device being shown in its inoperative position;

FIG. 15 is a view, similar to FIG. 14, but showing the release device in its operative position, FIG. 16 is a fragmentary, vertical, transverse sectional view of the switch assembly illustrated in FIG. 6, but showing the switches lowered to their inoperative position, where they may be wired, replaced or removed.

FIG. 19 is a fragmentary, side elevational view of auxiliary means for actuating an air valve or mounting it actuated for a special operation.

DETAILED DESCRIPTION OF THE INVENTION

Figure 17:
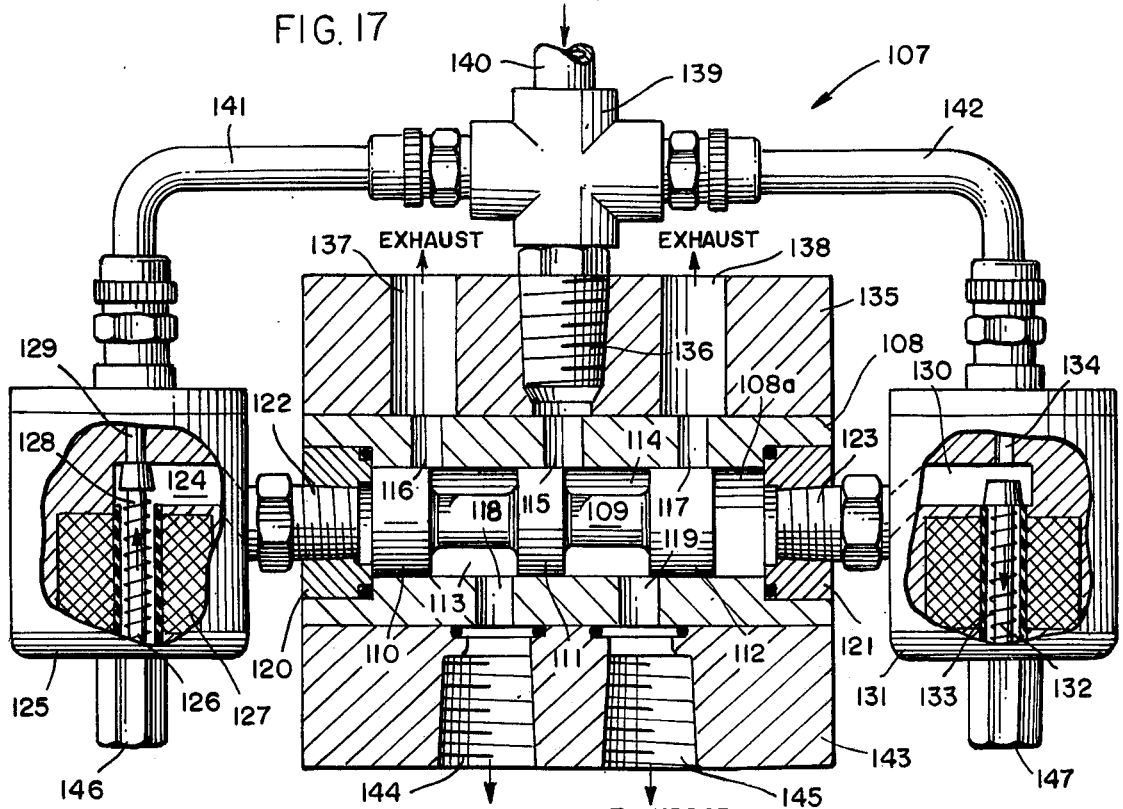
FIG. 17 is a schematic illustration of the pilot valve and air circuitry for operating a stepping motor to index the programming drum.

As indicated hereinabove, the programmer of the present invention is designed to be programmed in advance, and set up to actuate fluid valves or switches which will cause a series or sequence of operations to be performed in a predetermined order, and for controlled time periods. It should be understood that the invention is applicable to any machine to perform any operation or function which can be carried out by the use of fluid pressure, and preferably air pressure. To better understand the invention and its uses, reference is made, by way of example, to a trimming lathe wherein a part to be trimmed may be fed automatically to a spindle, whereupon a collet closes to hold the part thereon. The spindle is then elevated, and a clutch is engaged to rotate the spindle and the part. Trimming tools are then brought into contact with the part for trimming, then retracted, whereupon the spindle lowers and the brake is applied to stop the rotation thereof. The collet opens and the air jet blows off the part, and the next cycle starts. Each of these operations may be caused to be performed by a proper placement of the actuator pins on the indexing drum of the present invention, whereby each time an actuator shifts the spool of the valve upwardly, fluid under pressure will be directed to the mechanism utilized to perform the function.

As may be understood more clearly, hereinafter, the actuator pins may be so arranged on the drum that, as it rotates, selected pins will actuate associated valves by shifting the spools therein, so that the operations described above, by way of example, will be carried out in proper sequence, and for preselected time periods.

Referring now more particularly to the drawings, and especially to FIG. 1, there is illustrated in diagrammatic fashion various devices which may be actuated by the programmer for performing certain functions or operations. The programmer assembly is indicated, generally, by the numeral 1. The programmer or indexing drum is indicated, generally, by the numeral 2, and it is shown as mounted for rotation between the two end supporting plates 3 and 4. A plurality of air blocks 5 are mounted in side-by-side relation on an air manifold 6, also mounted between the end plates 3 and 4 above the drum 2.

The air input line is identified by the numeral 7 and shows air, under pressure, being admitted to a passageway in the air manifold. As will become more apparent hereinafter, when a valve is actuated, the air under pressure from the manifold will be directed to a device which will cause an operation in the machine to be performed. In this preferred form of the invention, a series of electric switches 8 is also associated with the indexing drum 2, and mounted lengthwise thereof so that the actuator pins on the drum may cause the switches to close in a predetermined sequence, and for predetermined time periods, thereby causing an impulse to be sent either to the air pilot valve to actuate the stepping motor or to a time delay relay or to another device which has associated therewith, a limit switch which will be caused to close, and rotate the drum when a given operation has been completed.

The drum 2 is caused to rotate intermittently by means of a stepping motor identified, generally, by the numeral 9. As far as the present invention is concerned, any suitable stepping motor can be used for indexing the drum, although it is preferred that the steppping motor disclosed and claimed in the Scholin et al co-pending application, Ser. No. 433,102, filed Jan. 14, 1974, now U.S. Pat. No. 3,868,861 be used herein.

As examples of some of the devices which can be actuated to carry out certain functions, there is illustrated an air cylinder 10 to which the air lines 11 and 12 are connected from one of the air blocks 5. As shown herein, the piston in the air cylinder 10 will normally be in its lower position, because the upper port in its associated air block is normally open so that air pressure will normally be applied in the upper part of the cylinder. When the valve is actuated by shifting the spool upwardly, the air under pressure will then be delivered to the lower part of the air cylinder below the piston therein, from the lower port in the air block and force the piston upwardly, whereupon the air above the piston therein will be exhausted.

The air line 13 may extend from another of the air blocks and be connected to an air hydraulic pump, which would be operated to carry out another function.

The air line 14 from another air block can be connected to an air pilot hydraulic valve, and the line 15 from still another air block could be connected to an air operated actuator.

The numeral 16 indicates a housing to which is connected the air lines 17 and 18 for operating a drill 19 and reciprocating the drill in an axial direction.

The numerals 20 and 21 identify air lines connected to a cylinder 22 for the purpose of rotating intermittently an indexing table 23. The numeral 24 indicates an electric time delay relay, which may be connected to one or more of the switches 8 in the event that a particular operation to be performed takes more time. The electrical impulse sent to the relay when a switch 8 is actuated starts the timer, and, at the end of the predetermined time period it will cause the drum to index to its next position for causing the next operation of the series to be performed.

Referring now especially to FIGS. 6, 7, 8 and 12, the manifold 6 is provided with a plurality of air passages extending lengthwise thereof. The upper and lower passages 25 and 26 are air exhaust passages while the intermediate passage 27 is the air inlet passage. In FIG. 12, it will be noted that the exhaust passages 25 and 26 are closed at one end and are open to the atmosphere at their other ends. The inlet passage 27 is likewise closed at one end but the other end thereof is suitably connected to the air input line 7 from a source of air under pressure. The plug 27a seals the drilled passageway. The inner face of the manifold 6 is provided with a series of ports 28, each of which communicates with the exhaust passage 25. The inner face of the manifold has an annular recess around each of the ports 28, adapted to receive an O-ring seal 29, for the purpose of creating a seal between the manifold and the adjacent valve body.

A similar series of ports 30 is provided in the inner face of the manifold 6, each of which communicates with the exhaust passage 26. Similar O-ring seals 31 are received in the annular recesses associated with each of the ports 30 to create a seal between the ports and their associated valve bodies.

There is also provided a series of ports 32 in the inner face of the manifold 6, each of which communicates with the inlet passage 27. Each port 32 is similarly provided with an O-ring seal 33, as described above.

The manifold 6 is also provided with a series of threaded openings 34 adjacent the top thereof, and another series of threaded openings 35, adjacent the bottom thereof. The bolts 34a and bolts 35a extend through the air blocks, and are threaded into the respective openings 34 and 35 in the manifold, thereby to maintain the air blocks and manifold in proper assembled relation.

The air blocks, generally indicated at 5, includes a series of valve bodies, each of which is identified by the numeral 36. Each valve body 36 is secured to the inner face of the manifold 6, and has suitable ports therein associated with the inlet and exhaust passages in the manifold, as may be understood more clearly hereinafter.

Within each valve body 36, there is located the valve spool 37, adapted to reciprocate therein to direct air from the inlet passage of the manifold to an air-operated device. When the spool is in one position thereof, air is directed to the device to cause a function or operation to be performed, such as moving a piston in one direction, and when the spool is in its other position, air is directed to the device to move the piston in the opposite direction.

A pin 37a extends through the bottom of the valve body 37, and has its upper end abutting against the lower end of the spool 37. When the pin 37a is reciprocated, it will cause reciprocation of the valve spool in a manner which will be pointed out more fully hereinafter.

Each air block also includes a port body 38, provided with a normally open port 39, and a normally closed port 40. Each port body has its inner face against the adjacent face of the valve body, and is secured thereto by means of the bolts 34a and 35a. As will be apparent, these bolts extend through each port body 38, and valve body 36, and are threaded into the openings in the manifold 6.

Each valve body 36 is provided with an upper port 41, in communication with the upper port 28 leading to the exhaust passage 25 in the manifold, and a lower port 42 communicating with the lower port 30 leading to exhaust passage 26 in the manifold. Each valve body also has an intermediate port 43 in communication with the intermediate port 32 leading to the inlet passage 27 in the manifold.

Each valve body also has an upper cap 44 thereon, having a suitable recess in the underside thereof to receive one end of a compression spring 45. The lower end of this spring bears against the upper end of the spool 37, thereby to urge the spool downwardly to the position thereof, shown in FIG. 7.

The spool is provided with a plurality of enlarged annular ribs or lands, cooperating with the various ports to open or close them. The upper and lower annular lands are identified by the numerals 46 and 47, respectively, and the intermediate land is indicated at 48. The lower end of the valve body 36 is provided with a lower cap 49, having an opening therethrough to guide the pin 37a in its reciprocating movement. It will thus be seen that when these various parts are in assembled relation, the pair of upper bolts 34a will pass through the port body 38, and the upper caps 44 and into the threaded openings 34 in the manifold 6. Likewise, the lower bolts 34a will pass through the port body 38, and the lower caps 49 and into the threaded openings 35 in the manifold 6. Suitable O-rings likewise are provided around each of the ports 39 and 40 at the inner ends thereof, so that in this assembled relation, all of the parts making up the air blocks and manifold will be secured together and sealed against leakage of any fluid which operates the various devices in the machine.

There is an annular space 50 around the stem of the spool valve between the lands 46 and 48. A similar annular space 51 is provided around the stem between the lands 47 and 48. A passage 52 extends through the wall of the valve body, and communicates at one end thereof with the annular space 50, and at the other end thereof with the normally open port 39.

A passage 53 is likewise provided in the valve body which communicates at one end thereof with the annular space 51, and at the other end thereof with the normally closed port 40. It will thus be evident from viewing FIG. 7, for example, that when the spool is in its lowermost position, the air under pressure from the inlet passage 27 will be directed through all of the ports 32 in the manifold, through the intermediate ports 43, and around the annular space 50 to the passage 52, and normally open port 39. As mentioned above, each port 39 has a suitable hose or air conduit connected thereto at one end, and which extends to the device which is to be actuated thereby.

For example, if the fluid pressure passing through port 39 is directed to one side of a piston within a cylinder in order to move it in one direction, then the other side of the piston where the air is to be exhausted will be connected by a suitable conduit to the normally closed port 40, so that air exhausted therefrom will pass outwardly through the passage 53 and around the annular space 51 to the exhaust passage 26 through ports 42 and 30.

When the spool is shifted upwardly to the position shown in FIG. 8, the fluid under pressure from the inlet passage 27 is then directed around the annular space 51, through the passage 53, and the normally closed port 40 to the opposite side of the piston, thereby moving the piston in the opposite direction thereof, and causing a particular function to be performed by movement of the piston. In this situation, the fluid on the opposite side of the piston will then be exhausted through the normally open port 39 to the exhaust passage 25, through the passage 52, annular space 50 and ports 41 and 28. At the end of some predetermined time period, which may be either instantaneous or prolonged, and after the function has been performed, the spool valve will be returned to its normal lowermost position, and the reverse flow of fluid will take place in readiness for the next time that the same function is to be performed.

Reciprocation of each of the spools is caused by actuation of a roller and bracket assembly 54, associated with each of the valve bodies. Each roller and bracket assembly comprises a body member 55, provided with a pivot pin 56, the ends of which are received within suitable openings in the legs 57 and 58, which are provided in spaced apart relation on the lower end of the port body 38.

The body member 55 is bifurcated thereby providing the spaced legs 59 and 60. A roller 61 is located between the legs 59 and 60, and is rotatably supported on a pin 62, extending between those legs. An operating pin 63 also extends between the legs in the bifurcated end of the body 55, adjacent the outer end thereof, and is positioned immediately below the reciprocating pin 37a so that such pin will rest on the operating pin 63. Thus, when the roller and bracket assembly 54 is rotated about the pivot pin 56, from the position thereof shown in FIG. 7, where the pin 37a rests upon the operating pin 63 in the lower position thereof, to the position shown in FIG. 8, the spool will be shifted to its uppermost position against the force of the compression spring 45. When the roller and bracket assembly rotates downwardly, the compression spring 45 will cause a shifting of the spool to its lowermost position, as shown in FIG. 7.

The programming drum, which has heretofore been identified and indicated generally by the numeral 2, is provided with a series of annular grooves throughout substantially the length thereof in which actuators for the air valves and for the switches may be releasably held. It is preferred that alternate grooves receive actuators for the air valves, and the remaining grooves therebetween receive actuators for the switches identified at 8 (see especially FIG. 5). The series of alternate grooves adapted to receive actuators for the air valves are indicated at 64, and those grooves adapted to receive actuators for the switches are identified by the numeral 65. As will be pointed out hereinafter, it is preferable, to facilitate programming, that the base of the grooves containing actuators for the valves have one color and the alternate grooves containing actuators for the switches have a different color. In actual practice, the grooves which contain the actuators for the air valves are colored black, and those which contain actuators for the switches are colored red. This enables the machine operator who is programming the device to determine, while the programming drum is outside of the machine, which grooves will be in alignment with the spools of the air valve, and which will be in alignment with the switch arms, so that the actuators for the valves and switches will be in proper relationship.

The grooves 64 and 65 are separated by the annular flanges 66, and each flange is provided with a series of radially extending recesses 67. Each of these flanges is provided with a groove in the peripheral edge thereof for the purpose of receiving a suitable, yieldable annular member, such as the garter springs 69. As will appear presently, these springs will yieldably retain the actuators in their respective grooves.

Although the actuators which operate the valves and switches may assume any desired form, it is preferred that they take the form, for example, of the programming pins 70 (see FIG. 4), each end of which is adapted to be received in the slots 67 of adjacent flanges 66. Each pin 70 is provided with an enlarged, intermediate body 71, so that when these pins are assembled onto the programming drum, as shown in FIGS. 2 and 5, the ends of the pins will be received in the radial slots 67 of adjacent flanges and the enlarged body portions 71 thereof will be positioned in the groove between the flanges. The annular, yieldable members or springs 69 are located in the peripheral groove of adjacent flanges, and will thereby hold the pins securely in place during operation of the device. By the use of this annular spring or other suitable yieldable member, the programming pins may easily be removed, and other pins inserted in proper positions for re-programming for use in other machines.

When the programming pins are located in the grooves 64, as shown in FIGS. 2 and 5, they will actuate the associated air valve. It will be noted that the roller 61 on each of the roller and bracket assemblies 54, when in its lowermost position, will be located within one of the grooves 64. As the programming drum rotates in a clockwise direction, as viewed in the various figures, the body portion 71 of one of the pins 70 will eventually contact the roller 61 of its associated roller and bracket assembly, and rotate the assembly to its uppermost position, as shown, for example, in FIGS. 8 and 15, thereby shifting the spool upwardly, causing the fluid under pressure to be directed to a predetermined device for performing a function.

If it is desired that a given valve remain open or in its actuated position for a period of time greater than the time it takes for one programming pin to actuate it, and continue to rotate the drum, the valve may be caused to remain in its shifted position by the use of filler pins 72, provided with an enlarged, substantially square body portion 73, which may be placed between two of the pins 70 and bridge the space therebetween, whereupon the valve will remain in its upwardly shifted position. See, for example, FIGS. 2 and 4.

Similar programming pins may also be used in the grooves 65 for actuating the switches 8. In FIGS. 5 and 6, for example, it will be noted that the switch arms for each switch extend into the proper grooves, and into the path of a programming pin, so that when the pin reaches the switch arm, it will be actuated.

In some cases, it may be desirable to provide double programming pins, such as that indicated at 74, in FIG.

3, wherein two enlarged body portions 75 on each pin are spaced apart. In this case, one end of each pin 74 will be received in the radial recesses 67 of a flange 66 and the space between the two in enlarged portions 75 will be received in the radial recess in the intermediate flange member. This arrangement may also be seen in FIG. 2, wherein one of the enlarged body members 75 is positioned in one of the grooves 64, and the other one is received in the adjacent groove 65. In this arrangement, the pin in the groove 64 will actuate its associated valve, and when the drum has rotated through 180°, the other enlarged body member 75 in groove 65 will actuate its associated switch.

The programming drum has at one end thereof a stub shaft 76 received within a sealed bearing 77 in the mounting plate 4. The assembly is provided with a removable bearing end cap 78, mounted on the outer face of the mounting plate 4, thereby to retain the drum in assembled relation.

The other end of the drum is provided with the stub shaft 79 which extends through the mounting plate 3, and is keyed to the ratchet wheel 80 in the stepping motor. This stub shaft 79 is also mounted in the bearing 81. This arrangement facilitates considerably removal of the drum for programming purposes. As will appear more fully hereinafter, when the switches and roller bracket assemblies have been moved out of the way, and the end cap 78 removed, the entire drum can be withdrawn from the assembly, and programmed outside of the machine by inserting the proper programming pins in the proper places for carrying out the sequence of operations in a predetermined order.

Each one of the switches 8 has the same construction, and preferably includes a roller arm or leaf 82, provided with the roller 83, at the end thereof (see FIGS. 6 and 16). Each switch is mounted on a switch plate 84, which, in turn, is pivoted on the switch rod 85, extending between the two mounting plates 3 and 4. Spacers 86 are positioned on the rod between adjacent plates 84, and the entire assembly of all of the switches and switch plates on the rod 85 are yieldably held in place against movement longitudinally of the rods by yieldable means, such as the compression spring 87 (see FIG. 5).

A bracket 88 is provided on the inner face of each mounting plate 3 and 4, each of which is recessed to receive a locking bar 89. When this locking bar 89 is in place, as shown in FIG. 6, all of the switches will be held in their operating position. Removal of the locking bar 89 will permit all of the switches to rotate downwardly from their position shown in FIG. 6 to the position shown in FIG. 16, in which position they may be repaired or replaced, and will also be out of the way so that the programming drum may be removed. There is also provided a rod 90, extending between the mounting plates for the purpose of limiting the upward movement of the switches.

Thus far, it will be noted that during the intermittent rotation of the programming drum, whenever a programming pin 70 or 74 in groove 64, comes against a roller 61 in the path thereof, it will cause the roller and its bracket to rotate upwardly about the pivot pin 56, whereupon the operating pin 63 will elevate the spool 37, thereby directing fluid pressure through the normally open port 39 to a device in the machine to be actuated thereby. If it is desired that this particular device be caused to function more than once during a given cycle, additional programming pins can be inserted in the same groove or a pin can be inserted in a different groove, so long as the value associated therewith is connected to the same device.

Likewise, whenever one of the programming pins 70 or 74 positioned in one of the grooves 65 reaches the roller 83 of the switch arm 82, during the intermittent rotation of the drum, the associated switch will be actuated, and a signal will be sent for shifting the slide of the stepping motor, and advancing the programming drum. As mentioned heretofore, if the function to be performed is of very short duration, actuating the switch may send the signal directly to the operating means for the stepping motor.

With respect to devices in the machine which perform functions by moving an element through a definite distance, such as, for example, a piston rod, actuation of the switch by the programming pin may send a signal to a switch or valve which begins movement of the piston, and at the end of the stroke, the piston rod may actuate a limit switch, indicating that the function has been complete, and send a signal to the operating means for the stepping motor to advance the programming drum.

With respect to certain other functions, the duration of which requires a specified time, the signal from the switch which has been actuated by the programming pin may be sent to a time-delay relay, and at the end of the time period, the signal for stepping the motor may be sent to the motor operating means.

Another one of the features of the present invention is the provision of manually operated means for actuating individual valves, either for a set up or testing purposes. In the present embodiment, there is provided a series of trip rods 91, mounted for longitudinal reciprocating movement in an elongated support bar 92 (see FIG. 6). There is one trip rod 91 for each of the valves, and to facilitate the operation thereof, the outer end of each such rod is provided with a knob or handle 93. The inner end of each rod 91 has an inclined surface 94 on the upper side thereof, and a stop pin 95. This stop is adapted to abut the inner face of the support bar 92 when the rod 91 is pulled outwardly so that complete removal of the rod may be prevented.

When it is desired to actuate the valve manually, the rod 91 may be pushed inwardly to the point where the inclined surface 94 will contact the roller 61, thereby raising it and the associated operating pin 63, upwardly, and shifting the spool valve in the manner described. If the rod is inadvertently left in its innermost position, cycling of the machine will cause a programming pin to come against the inner end of the rod, and push it back to its neutral or inactive position, since the drum rotates in a clockwise direction as viewed in the drawings.

A still further feature of the invention is the provision of means which enable a given valve to be shut off, thereby preventing air pressure from passing therethrough if it is not desired to operate the device connected with that particular valve during selected cycles of the machine. Normally, it would not be expected that more than one or two of these devices would be needed in a given machine.

Referring particularly to FIGS. 7 and 8, one of these means for shutting off the air flow is shown as consisting of a plunger 96, and a threaded stem 97, which threadedly engages an opening in a mounting block 98. This block is mounted on the rear face of the air manifold 6, by means such as the bolts 99. The inner end of the port 32 is provided with a valve seat 100, against which the tapered inner end 101 of the plunger 96 is adapted to abut when in its closed position. Suitable seals 102 and 103 are provided around the plunger, as shown, and it is a simple operation to rotate the plunger by means of a suitable knob or handle on the outer end thereof, to screw the plunger inwardly until it is against the seat 100. Since this plunger passes through the inlet passage, it will be evident that air under pressure passing therethrough will bypass the port to the air block, but will still be directed through the other valves in communication therewith.

As mentioned above, the drum is indexed by the use of a stepping motor, wherein a reciprocating pawl rotates a ratchet wheel to which the drum is keyed, so that the drum is indexed intermittently. In order to increase the speed to indexing the drum, the stepping motor is provided with a reciprocating pawl plate preferably having upper and lower pawls thereon and a double ratchet wheel, so that the drum is indexed in both directions of its reciprocation, all as described in greater detail in the aforementioned co-pending application.

The pawl plate of the stepping motor is indicated in FIG. 5 by the numeral 104. This plate is reciprocated by suitable means, but it is preferred that it be reciprocated by the use of one or more air cylinders. If one air cylinder is used, the piston thereof is secured to one end of the pawl plate, and will reciprocate the plate by means of a double acting piston in the cylinder. A preferred form, however, utilizes two air cylinders, one at the top and one at the bottom of the frame within which the pawl plate reciprocates. The lower air cylinder is illustrated in FIG. 5 by the numeral 105 and the upper air cylinder is shown at 106. When air is admitted into the cylinder 105 below the piston, it moves the pawl plate upwardly, and when air is admitted to the cylinder 106 above its piston, it will move the plate downwardly.

Ait is admitted to the upper and lower air cylinders by the use of an electrically operated pilot valve assembly, generally indicated by the numeral 107. This pilot valve is partially shown in FIG. 5 to illustrate its association with the stepping motor and programming drum. It is shown in greater detail, however, in FIG. 17. In general, when a programming pin on the drum closes one of the switches 8, a signal will be put out either directly to the pilot valve or to a time delay relay or a device in the machine which performs an operation, all as mentioned heretofore. The signal from one of the switches 8 or from another source, as described, will be directed to one of two solenoid valves, which will shift a spool valve and direct air under pressure to one or the other of the air cylinders 105 or 106.

Referring particularly to FIG. 17, the numeral 108 indicates a valve body within which there is a valve cylinder 108a. The spool valve 109 is adapted to reciprocate within the cylinder 108a. This spool valve is provided with a series of spaced apart annular lands 110, 111 and 112. This arrangement provides the annular spaces 113 and 114 between the intermediate land and the end lands.

The valve body 108 is provided on one side thereof with an air inlet port 115, and the air exhaust ports 116 and 117. The opposite side of the valve body is provided with the air outlet ports 118 and 119. The ends of the valve body are provided with end caps 120 and 121, having the air passages 122 and 123, respectively, passing therethrough.

Air under pressure may be directed through the passage 122 against one end of the air valve from a passage 124 in the solenoid valve body 125. There are two such solenoid valves, which are the purchased items and the construction thereof is well known. They are shown in FIG. 17 schmematically. Within the valve body 125, there is a reciprocating core 126 within the coil 127. The core is normally urged by a coiled compression spring 128 in a direction which will maintain closed, an air inlet port 129 within the valve body. Energizing the coil 127 will retract the core 126 against the force of the spring 128 for opening port 129, thereby admitting air to the spool valve through the passage 124.

At the other end of the valve body 108 air is admitted to the other end of the spool through the passage 130, within the solenoid valve body 131. This valve likewise is provided with a reciprocating core 132, normally urged by the spring 133 to a position which closes the port 134 within the valve body 131, and which opens the port when the coil is energized. It will thus be evident that air pressure admitted into one end ov the valve cylinder will force the spool in one direction, and air pressure at the other end thereof will force the spool in the opposite direction.

Associated with the air valve body 108 is the upper port block 135, provided with the air inlet passage 136. Air exhaust passages 137 and 138 are provided in the port block 135, at opposite sides of the inlet passage 136.

A tee connection 139 is threadedly connected to the air inlet passage 136, and has the conduit 140 connected to the opposite side thereof. This conduit is connected to a source of air under pressure (not shown). A conduit 141 at one side of this connection leads to the solenoid valve 125, and carries air under pressure, to the port 129 therein. A conduit 142 at the opposide side of the tee connection leads to the solenoid valve 131, and carries air under pressure, to the port 134 therein.

Also associated with the valve body 108 is a lower port block 143, provided with the air outlet passages 144 and 145. These air outlets are suitably connected by conduits to one or the other of the air cylinders 105 and 106. In the present instance, the air outlet passage 144 is connected to the lower air cylinder 105, and the air outlet passage 145 is connected to the upper air cylinder 106.

In FIGS. 5 and 17, the pawl plate is shown in its lowermost position. The spool valve 109 has moved toward the left due to the fact that the core 132 of the solenoid valve 131 has opened the port 134, thus allowing air pressure to reach the right end of the spool valve through the passages 130 and 123.

In this position of the spool, air will have entered the annular space 114 from the inlet passage 136, and has passed through the port 119, and air outlet 145, to the upper air cylinder 106 to urge the piston therein, and the pawl plate, downwardly.

As will presently be seen, the next signal, when another limit switch is closed, will energize the solenoid valve 125 to open the port 129 therein, and force the spool toward the right, by reason of the air under pressure passing through the air passages 124 and 122. When this occurs air will be directed from port 115, around annular space 113 and through passage 144 to the lower cylinder 105, thereby to move the pawl plate upwardly and again index the drum. The solenoid valves are provided with the exhaust ports 146 and 147, respectively, for exhaust of the air when the spool valve moves to force the air out of the valve cylinder 108a.

Figure 18:
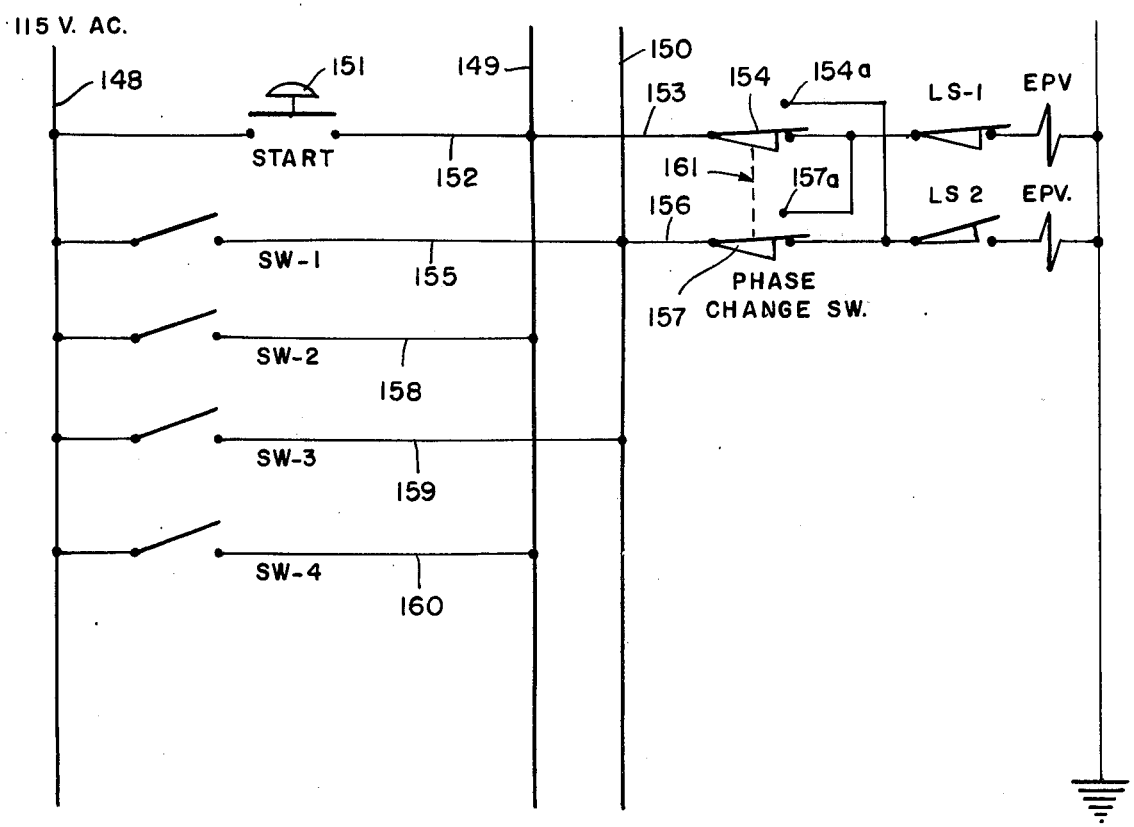
FIG. 18 is a schematic wiring diagram, showing the dual circuit for operating the electric pilot valves, and the phase change switch.

In FIG. 18, there is shown a schematic wiring diagram illustrating the preferred dual electric circuit used herein in which an electric signal is sent first to one and then the other of the electric pilot valves. In this figure, the hot leg of the circuit is indicated by numeral 148. The two legs 149 and 150 illustrate the lines connected to the respective solenoid valves to operate the stepping motor. The circuits to the stepping motor will be completed alternately between these two lines, as will presently be seen.

The start button is indicated at 151, and when this button is depressed, the circuit will be completed from the hot leg 148 to the leg 149 of the circuit through the line 152, and thence through line 153, and the closed switch 154. At this point, it may be noted in FIG. 5, that two limit switches are mounted in association with the stepping motor, the lower one being indicated by LS-1, and the upper switch being indicated at LS-2. As more fully described in the above-referred to co-pending application, the reciprocating pawl plate is provided with switch actuators so that when in its lower position, LS-1 will be closed, and when in its upper position, LS-2 will be closed. In FIG. 5, it will be seen that LS-1 is closed, and this is also shown in the wiring diagram of FIG. 18. Current has been carried through the circuit to the closed switch LS-1, and one of the electric pilot valves.

The switches which send signals to the pilot valve are in series with LS-1 and LS-2, so that even though one or the other of these switches is closed by movement of the pawl plate, nevertheless, the spool valve 109 will not be shifted by operation of a solenoid valve until a signal has been sent by the closing of one of the switches 8 or by one of the other switches which are operated at the end of the performance of an operation in the machine.

After pressing the start button, the circuit will be closed to one of the solenoid valves, and when the motor is stepped to move the pawl plate upward, the actuator thereon will then close LS-2, whereupon LS-1 will open. The other switches in the circuit, such as the switches 8, or in the time delay relay, or the limit switch, which is closed at the end of the operation, have been identified in the circuit of FIG. 18, by SW-1, SW-2, SW-3, SW-4, etc. It will thus be noted that in the upper position of the pawl plate with LS-2 closed, as soon as SW-1 is closed, due to the operation of one of the programming pins, the current will be carried from leg 148 through line 155 to the other leg 150 of the dual circuit, and through line 156 and closed switch 157 through LS-2 to its associated solenoid of the electric pilot valve.

This immediately shifts the spool to apply air pressure to the upper air cylinder 106, thereby forcing the pawl plate downwardly, and, again, indexing the drum in the manner heretofore described and closing LS-1.

When the next programming pin closes one of the switches 8, then SW-2 will be caused to close, thereby sending current through line 158, and leg 149 to LS-1, and its associated pilot valve. Closing of SW-3 will carry current through the line 159, through LS-2 to its solenoid valve, whereupon the closing of SW-4 will carry current through line 160 to LS-1, and the solenoid associated therewith.

This procedure follows, automatically, until a complete cycle of the drum and series of operations in the machine have been completed.

The switches 154 and 157 comprise a phase changing switch, generally indicated by the numeral 161. The incorporation of such a switch in the circuit is advantageous because spool valves have a tendency to shift position when a loss in line pressure occurs. Rather than try to reposition the spool mechanically, this phase-changing switch may be operated to, in effect, shift the position of the electric circuit to the stepping motor. When this switch is operated, the two arms will be shifted upwardly to the contacts 154a and 157a, respectively, so that current will then be carried to the opposite pilot valves.

In certain instances, it may be desirable to maintain one of the air valves 36-37, actuated for a longer period of time than normal during a given cycle. For example, it might be desirable to hold one workpiece of a series of workpieces in a position to have an additional operation performed thereon. This could be desirable for a number of reasons. If it were desired that one piece out of every 50 or 100 should have a hole drilled therein, for example, rather than adding a programming pin or changing pins in the programmer for one cycle out of 50 or 100, we have provided an auxiliary actuating means, either to actuate one of the air valves or to maintain it in actuated position for a longer period of time during this particular cycle.

Reference is particularly made to FIG. 19 which illustrates a preferred form of this auxiliary actuating means. A solenoid valve 162 may actuate a small air cylinder 163, wherein the piston rod 164 thereof is connected to an extra long roller and bracket assembly 55a. The circuit to the solenoid valve 162 may be manually operated by a single toggle switch so that when this particular cycle of the machine arrives, the operator may actuate the toggle switch to turn the circuit on. This, then, will hold the air valve actuated until the toggle switch is operated to turn off the circuit. It may be that a programming pin has already shifted the spool of the air valve, and closing the circuit to the solenoid valve 162 will maintain the spool valve shifted in the same manner, as though additional pins had been inserted in the same groove. When the additional operation is completed on the workpiece, then the switch is turned off, and the machine then continues to cycle in the normal manner.

The programming drum is mounted for easy removal for setup purposes, to permit the programming pins thereon to be initially arranged or to be re-arranged for other machines or for changing the order of operation in a given machine. The bearing end cap 78 is removably mounted on the supporting end plate 4, and when this cap is removed it is a simple matter to withdraw the drum through the opening in the end plate. It will be necessary, however, to make certain that all of the arms of the switches 8 have been moved to a position clear of the grooves in the drum, and it will likewise be necessary to move all of the roller and bracket assemblies 54 out of the way of the drum so that they will not interfere with the removal thereof.

To this end, there is provided an elongated bar 165 (FIG. 14) extending between the supporting end plates, which is provided with a threaded rod 166, at each end thereof. The inner ends of these rods extend through the bar 165, and are secured thererin by the collars 167, which will allow the rod 166 to rotate.

A mounting block 168 is secured to each of the support plates, each of which has a threaded opening therethrough for threadedly engaging each of the rods 166. A knurled knob 169 or other suitable handle means may be provided on the outer end of each rod 166, so that they may be rotated.

When the roller and bracket assemblies 54 are to be moved so as not to interfere with the removal of the drum, this arrangement enables them to be rotated out of the way in a simple and efficient manner. FIG. 14 illustrates this assembly, wherein the roller and bracket assembly 54 is in its lowermost position. When the two threaded rods 166 are screwed inwardly, they will carry the bar 165 to the position shown in FIG. 15, where it will be noted that it has been moved against the ends of all of the roller and bracket asemblies to elevate them out of the way of the drum for removal thereof.

FIG. 16 shows the locking bar 89, associated with the switches, having been removed whereupon all of the switches will drop downwardly about the rod 85, so that they will be out of the way of the drum, and in this position of the parts, the drum can be easily withdrawn.

It will be noted from FIG. 5 that around each end of the programming drum, numbers appear wherein each number represents an operation which is to be performed in the machine in that order. This simplifies the problem of programming, because the machine operator will know in advance which operation is to be performed, at which point in the cycle. He will then be able to mount the programming pins in the selected grooves on the drum for actuating a particular switch or valve at a particular point in the cycle. When all of the pins have been properly placed, the drum may then be assembled in the position shown in FIG. 5, whereupon the machine will be set up for cycling.

It is evident that we have thus provided novel means for programming the order and duration of a series of operations to be performed in a machine wherein these operations can be performed by the use of fluid under pressure. For set up purposes, and testing the fluid supports, each valve may be operated manually.

It has been estimated that the programmer of the present invention has made it possible to eliminate approximately one mile of wire and about 14 relays, thereby making the machines less costly to produce. There are no restrictions on the number of operations which can be controlled by the use of this programmer. It is merely necessary to make the drum longer to provide more grooves into which programming pins can be inserted.

Changes may be made in the form, construction and arrangement of parts from those disclosed herein without in any way departing from the spirit of the invention or sacrifing any of the attendant advantages thereof, provided, however, that such changes fall within the scope of the claims appended hereto.

We claim:

1. A systems programmer for automatically controlling a predetermined sequence of operations in a machine, comprising a drum mounted for rotation, a series of annular grooves on said drum having annular flanges therebetween, each of said flanges being formed with an annular groove in the periphery thereof and having a plurality of radially extending recesses therein, a series of actuatable members associated with said drum in spaced relation thereto, and positioned along the length thereof, each said member being operable to cause one of a plurality of operations to be performed when actuated, a plurality of cylindrically shaped actuator pins for said members having axially extending end portions of smaller diameter than the central portion thereof, said end portions being removably received in said recesses on said drum along the length thereof in a predetermined arrangement, each adapted to actuate a selected one of said members during rotation of said drum, an annular yieldable ring member recieved in each of said annular grooves in the periphery of said flanges for retaining said actuators therein, and means to rotate said drum.

2. The combination of elements defined in claim 1, wherein each of said members is an air valve, and a source of air under pressure.

3. The combination of elements defined in claim 1, wherein each of said actuator pins is positioned on said drum so that the member associated therewith will be in the path of movement thereof as it rotates with said drum, thereby to actuate said member associated therewith.

4. The combination of elements defined in claim 1, combined with a source of fluid under pressure, and wherein each of said members is a fluid valve connected to said source, each said valve comprising a valve body and a spool valve reciprocable therein, and means associated with each of said valves positioned in the path of movement of selected actuators on the drum to shift the spool valve associated therewith when actuated by the selected actuator due to rotation of the drum.

5. The combination of elements defined in claim 1, wherein said last named means comprise a stepping motor for rotating said drum in a step-by-step movement.

6. The combination of elements defined in claim 4, wherein the fluid under pressure is air.

7. The combination of elements defined in claim 4, wherein said last named means includes a pivotally mounted roller and bracket assembly, wherein the roller thereon is normally in the path of movement of said actuators.

8. The combination of elements defined in claim 5 combined with means associated with said drum to initiate a signal when actuated, to operate said stepping motor to advance said drum, and a second plurality of actuator pins having the same configuration as said first named pins, removably mounted in others of said recesses of said flanges, each adapted to actuate said last named means when said drum is stepped.

9. The combination of elements defined in claim 8, wherein said last named means comprises a plurality of limit switches mounted in side-by-side relation along the length of said drum and each associated with one or more of said second plurality of actuator pins.

10. A systems programmer as defined in claim 1, including manually operable camming means associated with each of said actuatable members for actuating said members individually without rotating said drum.

11. A systems programmer as defined in claim 1, wherein said actuatable members are air valves, combined with an air manifold and a source of air under pressure connected with said manifold and said air valves, and manually operable means to shut off the air supply to selected individual air valves without affecting the flow of air to the remaining air valves from said source.

12. A systems programmer as defined in claim 1, wherein said actuatable members are air valves, combined with a source of air under pressure communicating with each of said valves, a lever arm associated with each of said valves, said actuator pins adapted to operate said lever arms to actuate said valves during rotation of said drum, and an auxiliary electrically operated air cylinder for use with selected ones of said lever arms for actuating said selected lever arms and the air valves associated therewith independently of said actuator pins on said drum.

13. A systems programmer for automatically controlling a predetermined sequence of operations in a machine, comprising a drum mounted for rotation, a series of actuatable members associated with said drum in spaced relation thereto, and positioned along the length thereof, each said member being operable to cause one of a plurality of operations to be performed when actuated, a plurality of actuators for said members removably mounted on said drum along the length thereof in a predetermined arrangement, each adapted to actuate a selected one of said members during rotation of said drum, a stepping motor for rotating said drum is a step-by-step movement, a plurality of limit switches mounted in side-by-side relation along the length of said drum, each adapted to initiate a signal when actuated to operate said stepping motor to advance said drum, a second plurality of actuators removably mounted on said drum along the length thereof, each adapted to actuate one of said switches when said drum is stepped, means for pivotally mounting each of said switches for rotation between first position for actuation by one or more of said second plurality of actuators, and a second position away from said second plurality of actuators, and a locking bar operatively associated with said switches to lock a plurality of said switches simultaneously in said first position thereof.

14. The combination of elements defined in claim 13, combined with support plates at each end of said drum in which said drum is mounted for rotation, an opening in one of said plates through which said drum may be withdrawn and removed from the supports, removable retaining means for said drum and means for manually moving of said actuatable members to the actuated position thereof to free said drum for withdrawal when all of said switches are in said second position.

* * * * *

UNITED STATES PATENT OFFICE
CERTIFICATE OF CORRECTION

PATENT NO. : 4,004,497
DATED : January 25, 1977
INVENTOR(S) : Harold W. Scholin, Hieronim L. Lisiecki It is certified that error appears in the above-identified patent and that said Letters Patent are hereby corrected as shown below:

Col. 2, lines 23 and 24, delete "operation may be determined in advance, and quickly and easily";

Col. 5, line 48, change "includes" to --include--;

Col. 6, line 36, change "34a" to --35a--; and

Col. 11, line 40, change "Ait" to --Air--;

Signed and Sealed this twenty-sixth Day of July 1977

[SEAL]

Attest:

RUTH C. MASON
Attesting Officer

C. MARSHALL DANN
Commissioner of Patents and Trademarks